J. A. ROBERTSON.
FILM SPOOL CENTER.
APPLICATION FILED JAN. 4, 1912.
1,100,100.
Patented June 16, 1914.
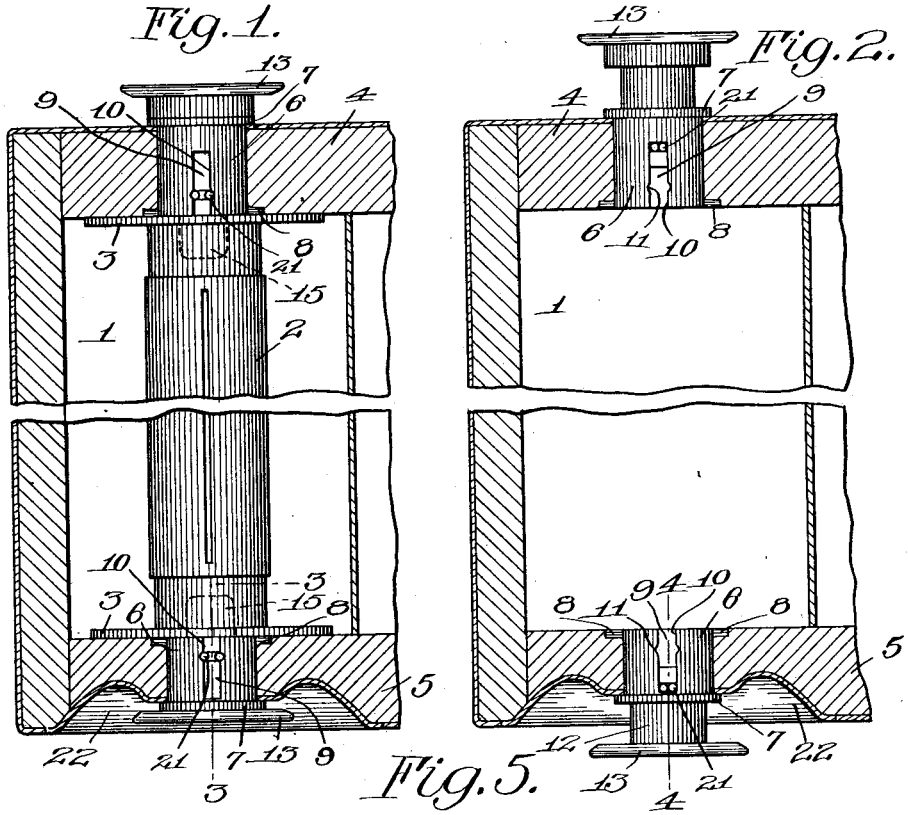
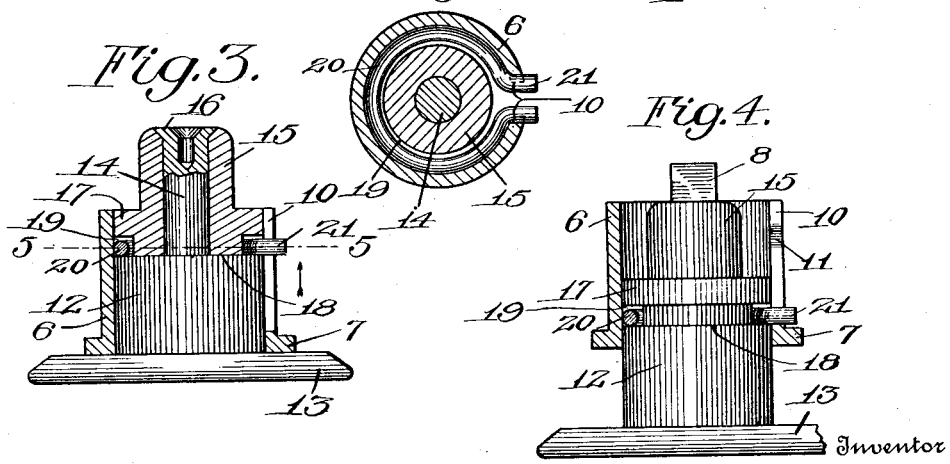
Witnesses
Nelson H. Opp
Russell B. Griffith
Inventor
John A. Robertson
By
his Attorneys

UNITED STATES PATENT OFFICE.

JOHN A. ROBERTSON, OF MONROE, NEW YORK, ASSIGNOR TO EASTMAN KODAK COMPANY, OF ROCHESTER, NEW YORK, A CORPORATION OF NEW YORK.

FILM-SPOOL CENTER.

1,100,100.     Specification of Letters Patent.     Patented June 16, 1914.

Application filed January 4, 1912. Serial No. 669,515.

*To all whom it may concern:*

Be it known that I, JOHN A. ROBERTSON, of Rochester, in the county of Monroe and State of New York, have invented certain new and useful Improvements in Film-Spool Centers; and I do hereby declare the following to be a full, clear, and exact description of the same, reference being had to the accompanying drawings, forming a part of this specification, and to the reference-numerals marked thereon.

My present invention relates to photography and more particularly to photographic film cameras and roll holders therefor, and it has for its object to provide a simple, cheap and easily assembled center for either or both ends of the film spool to form a journal for, and hold the spool in position during the winding or unwinding movement.

An object of the invention is to provide improved means for locking the center in operative position and for generally maintaining it in any adjusted position.

To these and other ends the invention consists in certain improvements and combinations of parts all as will be hereinafter more fully described, the novel features being pointed out in the claims at the end of the specification.

In the drawings: Figure 1 is a vertical sectional view through a portion of a film camera or roll holder, showing a film chamber and spool provided with centers constructed in accordance with and illustrating one embodiment of my invention, the centers being in their inward or operative position; Fig. 2 is a similar view with the centers withdrawn, or retracted, and the spool removed; Fig. 3 is a longitudinal section through one of the centers taken substantially on the line 3—3 of Fig. 1; Fig. 4 is a view similar to Fig. 3, but taken in section on the line 4—4 of Fig. 2 before the legs 8 are bent down; and Fig. 5 is a transverse sectional view taken substantially on the line 5—5 of Fig. 3.

Similar reference numerals throughout the several figures represent the same parts.

As illustrated herein, the invention is applied to the feed spool of a camera, permitting the application of a center constructed in accordance with the present invention for each end of the spool, but as one is practically a duplication of the other a description of one will suffice for both. Referring, therefore, more particularly to the drawings, 1 indicates the film chamber for the feed spool 2 which may be of the usual construction embodying end flanges 3 and an axial recess on each end face for the center hereinafter described.

4 and 5 indicate portions of the camera casing forming the opposite end walls of the film chamber 1 and each wall is suitably bored to receive a tubular socket piece 6 that is preferably provided with a shoulder 7 at its outer end coöperating with the outer surface of the wall, and a pair of laterally turned lugs or projections 8 at the inner end that engage the inner face of the wall and hold the socket in place. The socket may be easily inserted from the exterior and the spurs or projections 8 clenched down, as will be understood. At one side, the tubular socket is slotted, which slot 9 extends longitudinally of the socket to open at the inner end and form parallel bearing faces 10. At a suitable point as hereinafter defined, these bearing surfaces are provided wth oppositely arranged recesses 11 forming locking shoulders.

Slidable longitudinally within the tubular socket is a stem 12 having a suitable head or finger piece 13 at its outer end that remains upon the exterior of the casing while the inner end 14 thereof is reduced to receive a tubular thimble 15 that constitutes the center proper or spool-engaging projection that enters the recess in the end of the spool, to journal the latter and hold it in place. This member 15 may be secured to the stem in any suitable manner, as by heading it over at 16, and formed on the said member is an annular shoulder 17 that is spaced from the shoulder 18 on the stem left by the reduced portion 14 thereof, so that an annular recess 19 is provided. Within this recess I arrange a resilient ring 20, or circular spring, that thus surrounds the stem and is confined by the walls of the socket. The ends of the ring are turned outwardly in parallel relationship to form laterally yielding abutments 21, and so positioned that as the stem 12 is moved longitudinally within the socket these abutments will traverse the surfaces 10, their tendency being to separate, and when they reach the region of the recesses 11 they will snap into the same and operate to maintain the stem in the position it has then assumed, although they will be forcibly disengaged in the same manner by an abnormal pull on the finger piece.

The operation of the device will be readily understood.

The recesses 11 are so positioned in the present embodiment that the stem will be retained in its inward or spool-engaging position, as shown in Fig. 1, when the abutments 21 are in engagement therewith, but when the stem is withdrawn, as in Fig. 2, to release the spool (the spool-engaging portion 15 at that time being retracted within the socket), the abutments move to the opposite end of the slot 9 and the end wall of the latter limits their movement in this direction and the outward movement of the stem. But when in this position, they will still have a tendency to maintain the stem retracted because of their frictional engagement with the surfaces 10. Thus the operator may retract the stems and then withdraw the spool, or insert a fresh one, without being required at the same time to maintain his grip on the finger pieces.

The independent construction of the tubular spool-engaging thimble 15 from the stem proper is of advantage, not only in assembling the device and more particularly in positioning the ring 20, but because this construction permits thimbles of different sizes or different diameters as to their projecting portions, for spools of different sizes having end recesses of different sizes, to be assembled in a mechanism that is in other respects suitable and the same for all sizes of spools.

The lower wall 5 of the casing in the figures is shown recessed at 22 about the head 13 for the purpose of countersinking this head so that the lower surface of the wall may act as the supporting surface without allowing the camera to rest upon the centers.

I claim as my invention:

1. In a film spool center, the combination with a socket member and a cylindrical stem movable longitudinally therethrough between an inward spool-engaging position and a retracted position, said stem being provided with a circumferential guide, of coöperating abutments on said members for maintaining the stem in one of said positions, that on the stem comprising a yielding resilient projection movable in the guide adapted to snap laterally in a circumferential direction relatively to the stem into and out of engagement with the other as the stem is moved into and out of such position.

2. In a film spool center, the combination with a socket member and a stem movable longitudinally therethrough between an inward spool-engaging position and a retracted position, of a longitudinal bearing surface on one of said parts provided with a locking abutment and a resilient ring carried by and surrounding the other and having an outwardly projecting laterally yielding portion forming an abutment adapted to snap into and out of engagement with the first mentioned abutment as the stem is moved into and out of one of its said positions.

3. In a film spool center, the combination with a socket member having a longitudinally extending bearing surface provided with a locking abutment, of a stem movable longitudinally within the socket between an inward spool-engaging position and a retracted position and provided with an annular recess, a resilient ring held within the recess and provided with an outwardly projecting and laterally yielding end portion adapted to traverse the bearing surface and to snap into and out of engagement with the locking abutment on the socket as the stem is moved into and out of one of its positions.

4. In a film spool center, the combination with a tubular socket piece having a longitudinal slot therein provided with recesses in its opposite walls, of a stem movable longitudinally therein between an inward spool-engaging position and a retracted position, and a pair of laterally yielding resilient abutments on the stem adapted to traverse the slot in the socket piece and to snap respectively into and out of the recesses in the latter in opposite directions as the stem is moved into and out of one of its positions.

5. In a film spool center, the combination with a tubular socket piece having a longitudinal slot therein provided with recesses in its opposite walls, of a stem movable longitudinally therein between an inward spool-engaging position and a retracted position, and a resilient ring carried by and surrounding the stem and having its ends turned outwardly to form a pair of laterally yielding resilient abutments adapted to traverse the slot in the socket piece and to snap respectively into and out of the recesses in the latter in opposite directions as the stem is moved into and out of one of said positions.

6. In a film spool center, the combination with a camera having a film chamber and a stem extending through a wall of the latter and having a finger portion at its outer end exteriorly of the chamber and a reduced portion at its inner end interiorly of the chamber, of a cylindrical tubular spool engaging tip or member surrounding and secured to the inner reduced portion and embodying a part adapted to enter the bore of the spool.

7. In a film spool center, the combination with a tubular socket piece having a longitudinal slot therein provided with recesses in its opposite walls, of a stem movable longitudinally therein between an inward spool-engaging position and a retracted position, and having a finger portion at its outer end and a reduced portion at its inner end forming a shoulder, a spool-engaging member surrounding the reduced portion and provided with a shoulder spaced from that on the stem to form an annular recess, and a resilient ring arranged in the recess and having its ends turned outwardly to form a pair of laterally yielding resilient abutments adapted to traverse the slot in the socket piece and to respectively snap into and out of the recesses in the latter in opposite directions as the stem is moved into and out of one of said positions.

JOHN A. ROBERTSON.

Witnesses:
RUSSELL B. GRIFFITH,
NELSON H. COPP.

Copies of this patent may be obtained for five cents each, by addressing the "Commissioner of Patents, Washington, D. C."